US011000032B2

(12) United States Patent
Kwak et al.

(10) Patent No.: US 11,000,032 B2
(45) Date of Patent: May 11, 2021

(54) ANTIFUNGAL COMPOSITION CONTAINING CARYOLAN-1-OL

(71) Applicant: INDUSTRY-ACADEMIC COOPERATION FOUNDATION GYEONGSANG NATIONAL UNIVERSITY, Jinju-si (KR)

(72) Inventors: Youn-Sig Kwak, Jinju-si (KR); Chung Gyoo Park, Jinju-si (KR); Gyeongjun Cho, Jinju-si (KR); Junheon Kim, Dongducheon-si (KR)

(73) Assignee: INDUSTRY-ACADEMIC COOPERATION FOUNDATION GYEONGSANG NATIONAL UNIVERSITY, Jinju-si (KR)

( * ) Notice: Subject to any disclaimer, the term of this patent is extended or adjusted under 35 U.S.C. 154(b) by 0 days.

(21) Appl. No.: 16/335,436

(22) PCT Filed: Jun. 23, 2017

(86) PCT No.: PCT/KR2017/006649

§ 371 (c)(1),
(2) Date: Mar. 21, 2019

(87) PCT Pub. No.: WO2018/062668

PCT Pub. Date: Apr. 5, 2018

(65) Prior Publication Data

US 2020/0015478 A1 Jan. 16, 2020

(30) Foreign Application Priority Data

Sep. 28, 2016 (KR) ........................ 10-2016-0124554

(51) Int. Cl.

| | |
|---|---|
| ***A01N 31/06*** | (2006.01) |
| ***A01N 63/20*** | (2020.01) |
| ***A01N 63/28*** | (2020.01) |
| ***A01G 7/06*** | (2006.01) |
| ***A01N 63/10*** | (2020.01) |

(52) U.S. Cl.
CPC ............... *A01N 31/06* (2013.01); *A01G 7/06* (2013.01); *A01N 63/10* (2020.01); *A01N 63/20* (2020.01); *A01N 63/28* (2020.01)

(58) Field of Classification Search
None
See application file for complete search history.

(56) References Cited

PUBLICATIONS

Tan et al., "Volatile constituents of the fruit of Garcinia atroviridis and their antibacterial and anti-inflammatory activities", Flavour and Fragrance Journal, Jan. 2013, vol. 28(1), pp. 2-9; Abstract only.*

"Cropwatch", Amy Timmerman et al., University of Nebraska-Lincoln, "Plant Disease: Pathogens and Cycles", downloaded on Mar. 31, 2020 from https://cropwatch.unl.edu/soybean-management/plant-disease, 10 pages, 2020.*

Nakano, Chiaki et al., "Characterization of a Novel Sesquiterpene Cyclase Involved in (+)-Caryolan-1-ol Biosynthesis in Streptomyces griseus," The Journal of Biological Chemistry, vol. 286, No. 32, pp. 27980-27987, Aug. 12, 2011.

Medimagh, Sined et al., "Chemical composition, Antimicrobial and anti-acetylcholinesterase activities of essential oils from the *Tunisian Asteriscus maritimus* (L.) Less," Mediterranean Journal of Chemistry, vol. 2, No. 2, pp. 459-470, 2012.

* cited by examiner

*Primary Examiner* — Savitha M Rao
*Assistant Examiner* — Gregg Polansky
(74) *Attorney, Agent, or Firm* — Nixon & Vanderhye P.C.

(57) ABSTRACT

The present invention relates to an antibacterial or plant disease control composition containing caryolan-1-ol. According to the present invention, the caryolan-1-ol, as a volatile substance isolated from a *Streptomyces* sp. strain, has an excellent antifungal effect on various plant pathogens including *Botrytis cinerea, Fusarium oxysporum, Phytophthora nicotinae, Colletotrichum gloeosporioides, Rhizoctonia cerealis, Rhizoctonia solani* and *Gibberella moniliformis* and the like, and has storage disease preventive and herbicidal activity, thereby being usable as an antibacterial composition and a plant disease control composition.

2 Claims, 9 Drawing Sheets

[FIG. 1]
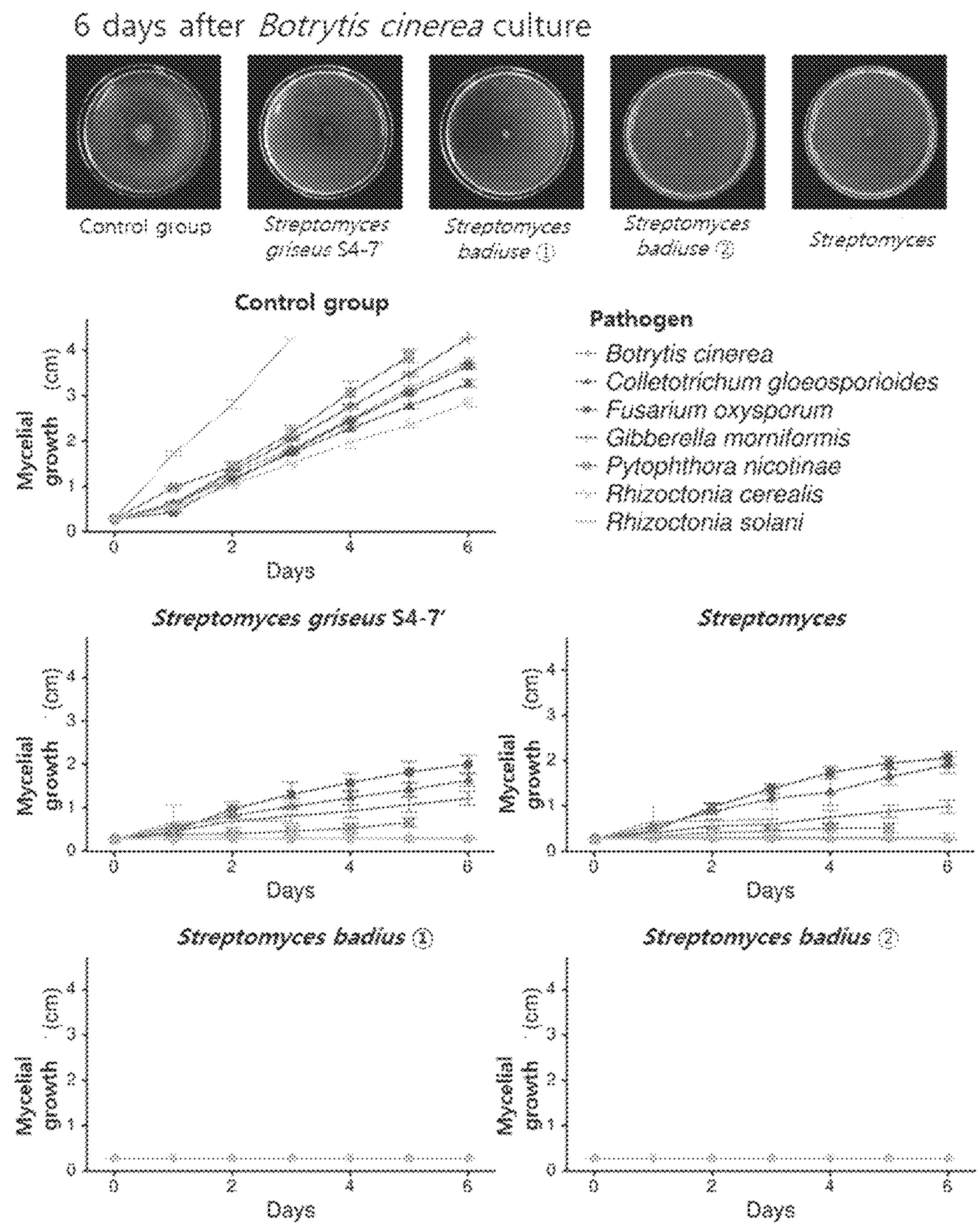

[FIG. 2]
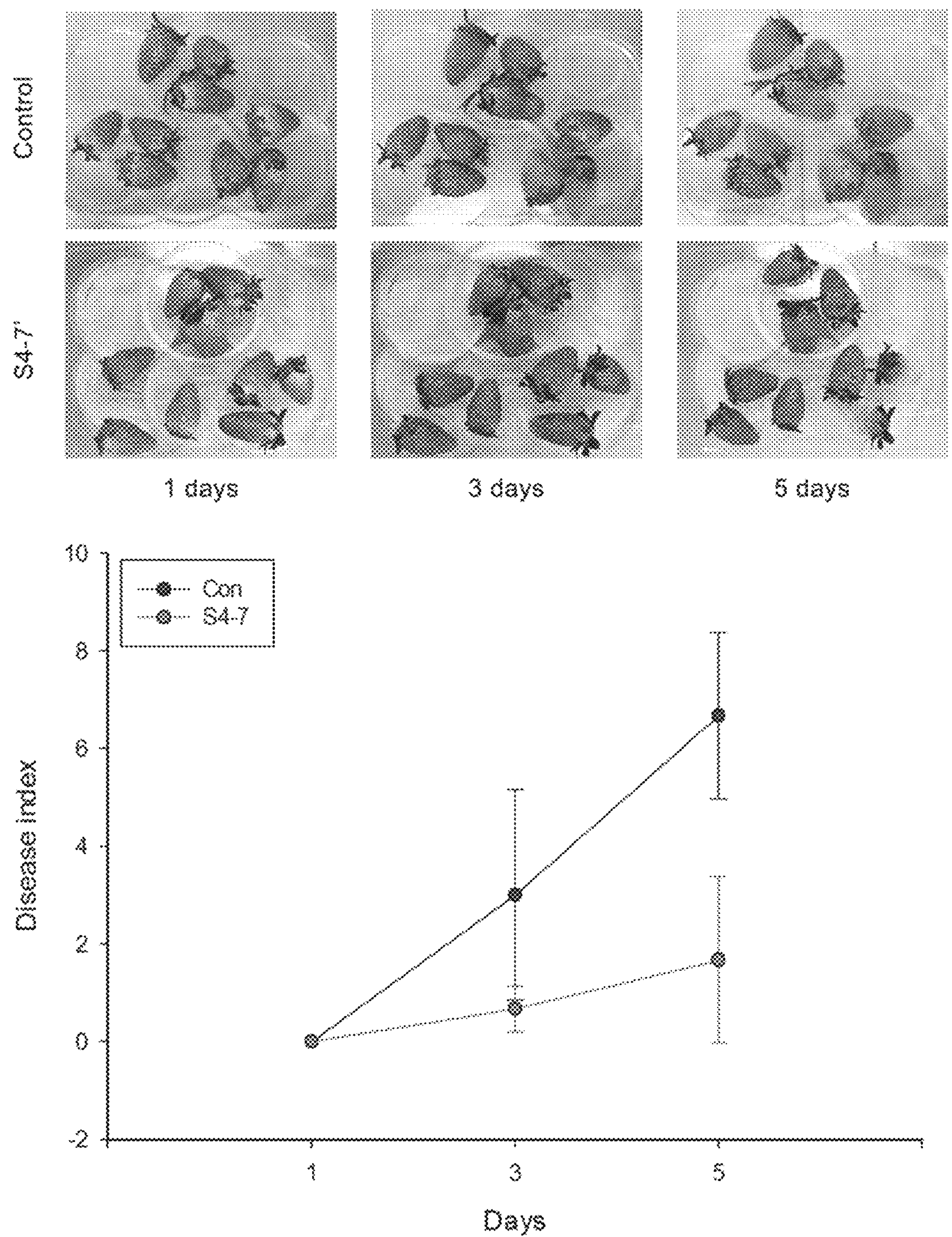

[FIG. 3A]
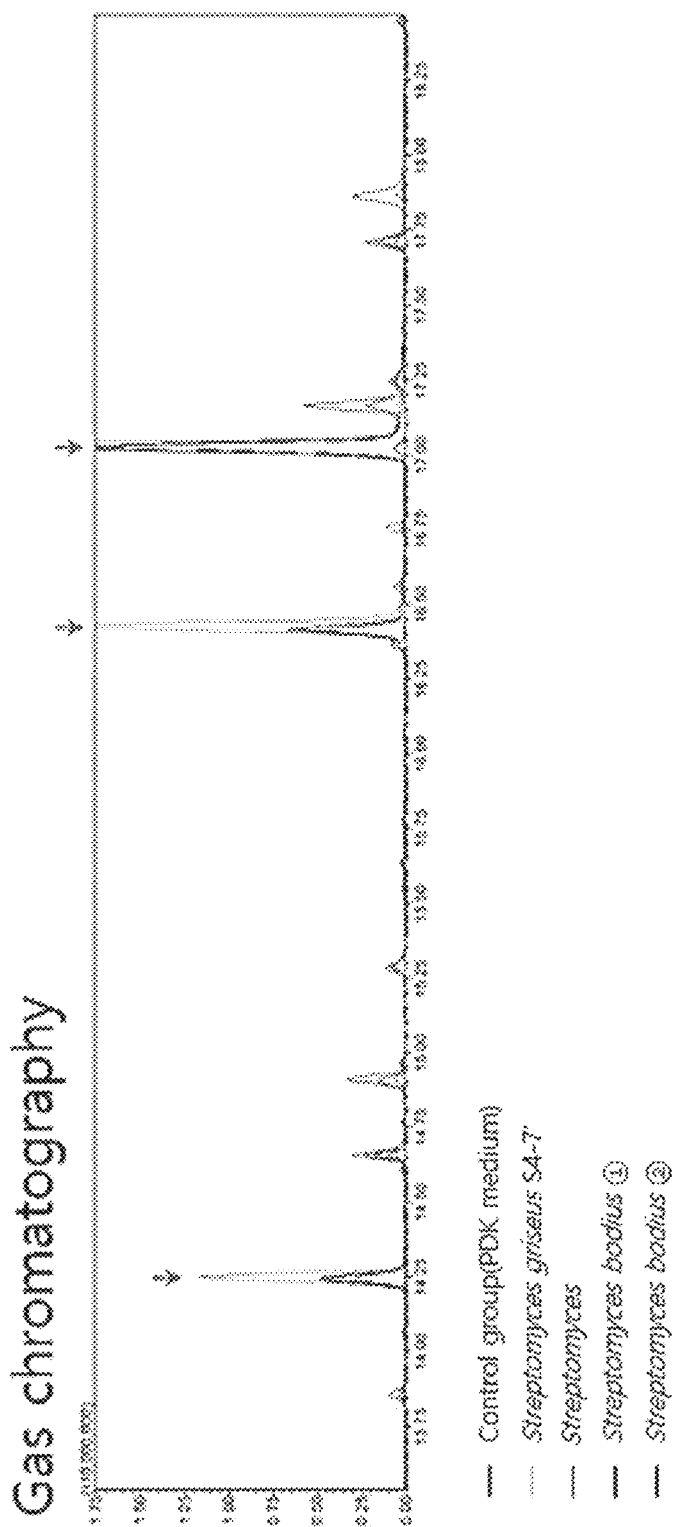

[FIG. 3B]
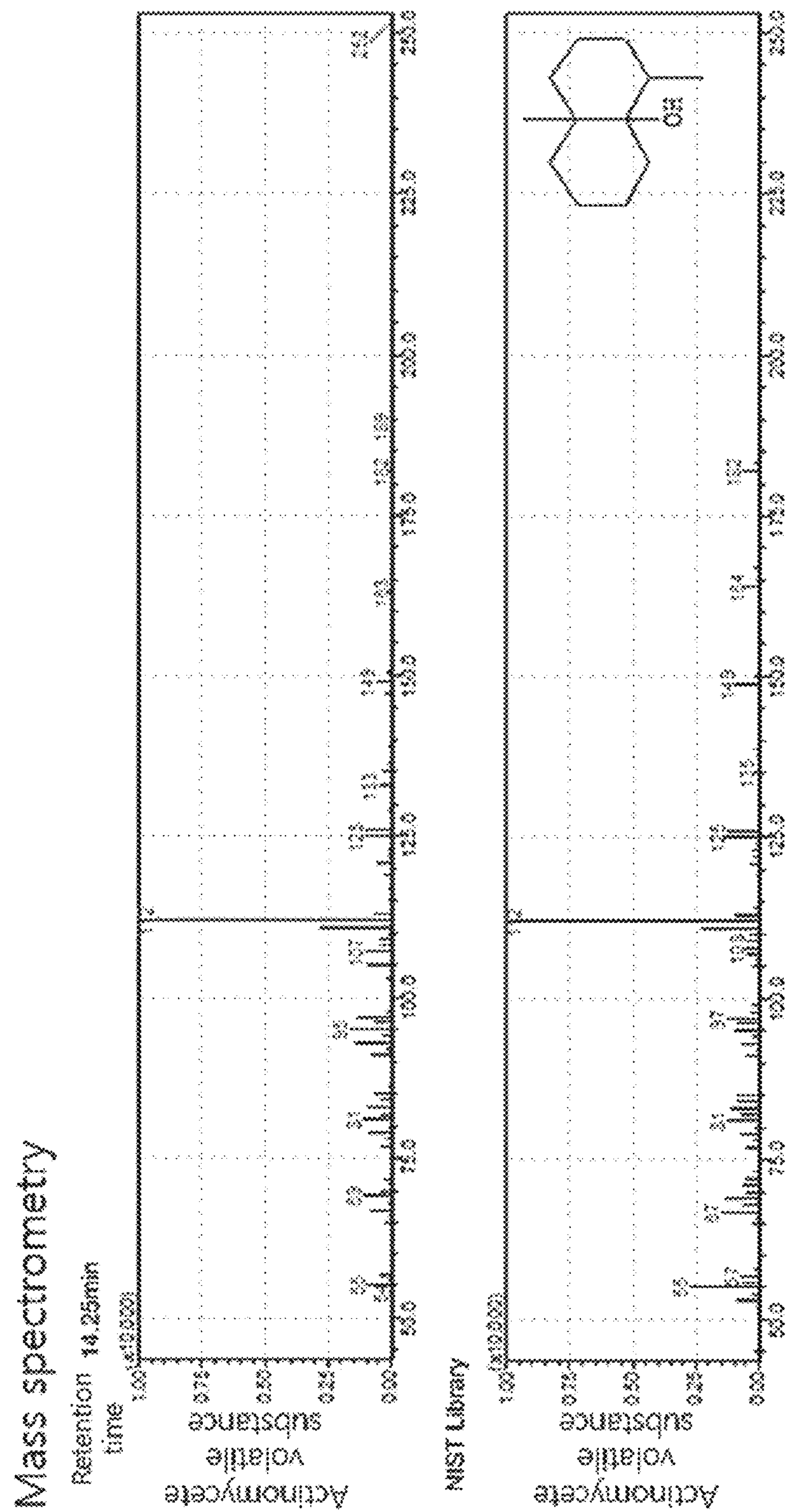

[FIG. 3C]
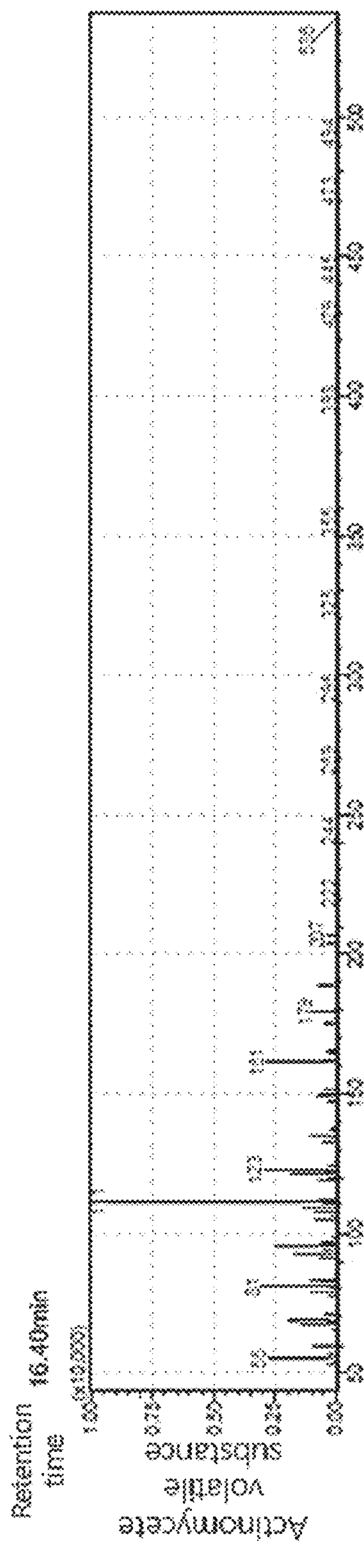
Nakano C et al. Characterization of a novel sesquiterpene cyclase involved in (+)-caryolan-1-ol biosynthesis in Streptomyces griseus., J. Biol Chem. 2011
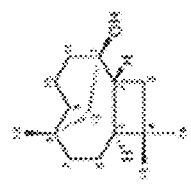
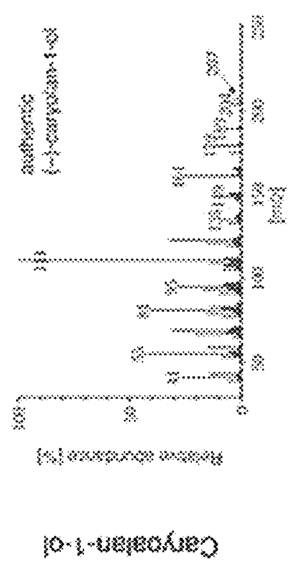

[FIG. 4]
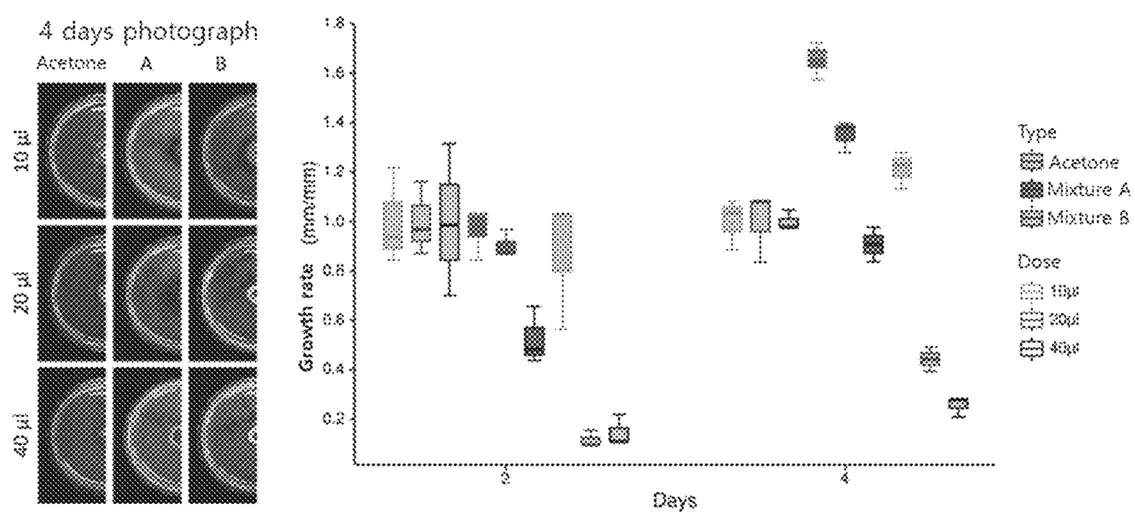

[FIG. 5A]
Gas chromatography
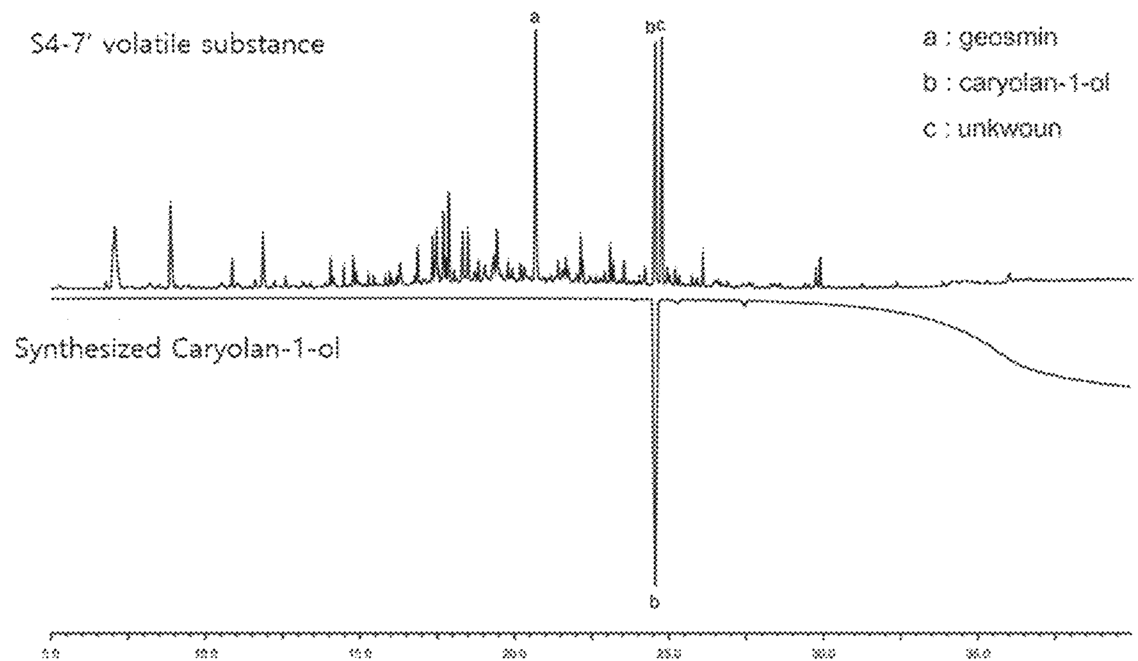

[FIG. 5B]
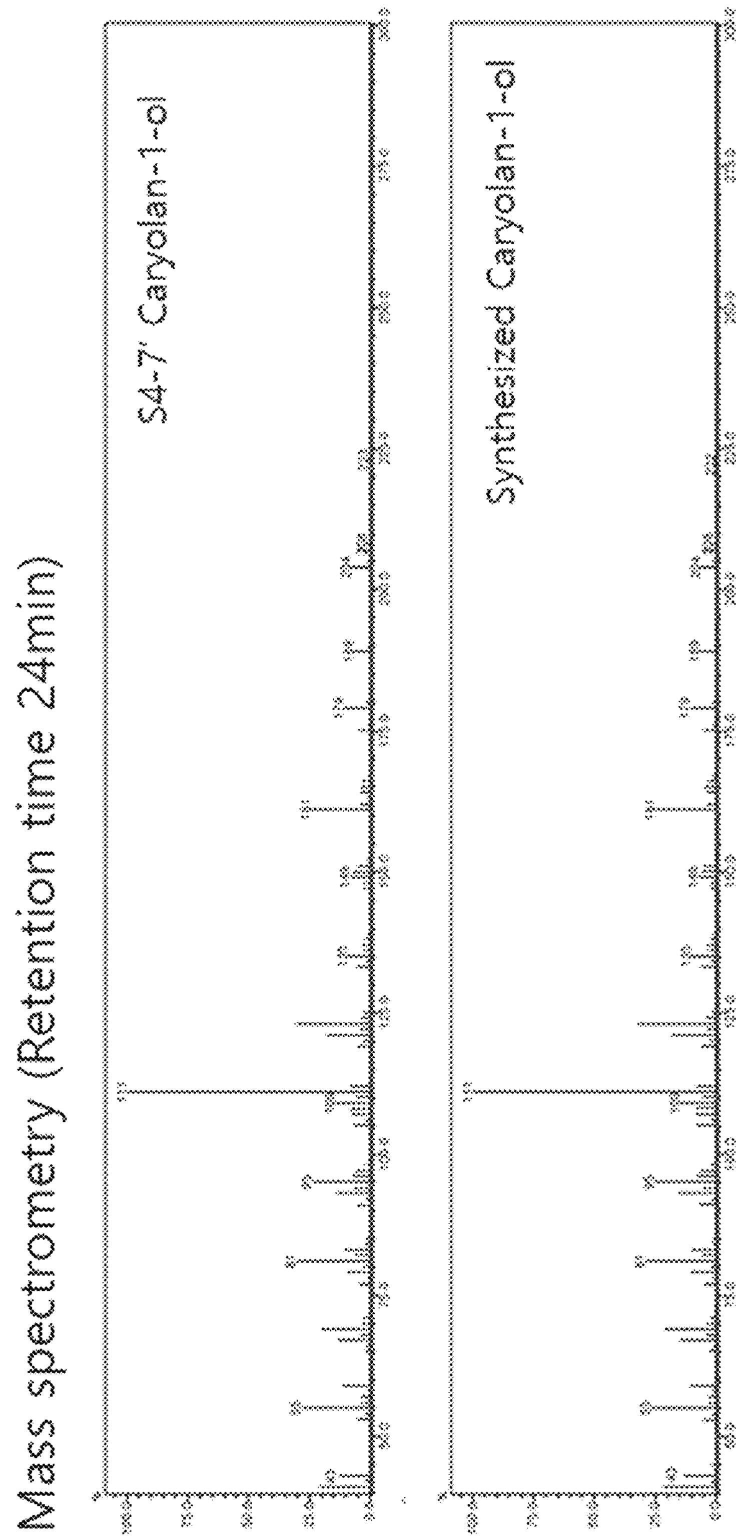

[FIG. 6]
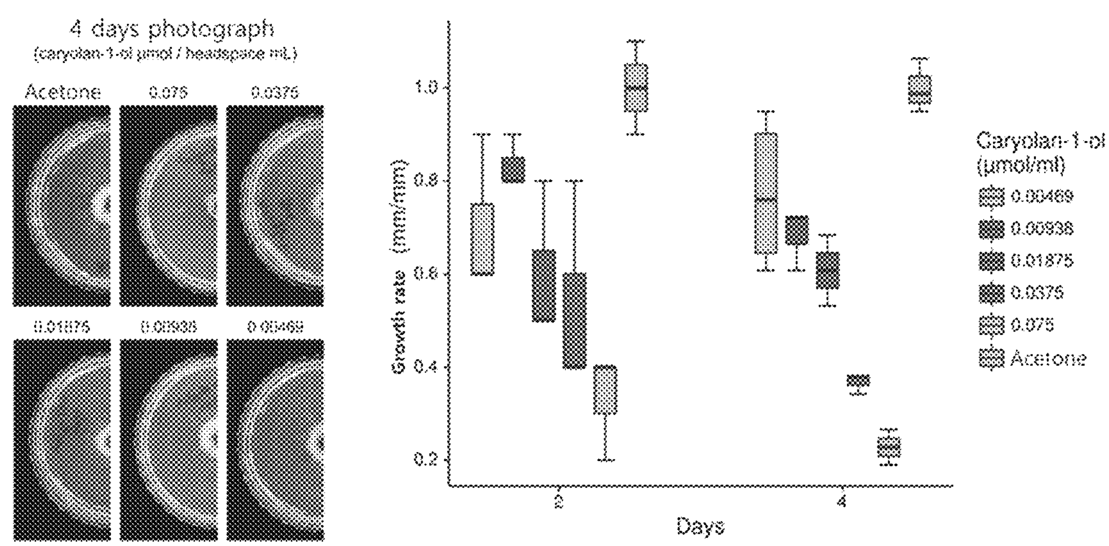

ANTIFUNGAL COMPOSITION CONTAINING CARYOLAN-1-OL

TECHNICAL FIELD

The present invention relates to an antifungal composition containing caryolan-1-ol or a plant disease control composition containing caryolan-1-ol.

BACKGROUND ART

Crops face a number of environmental stresses such as wind damage or water damage during cultivation. Food production is significantly dependent on how well one controls biological factors such as diseases, pests, and weeds as well as physical factors due to unusual weather changes.

So far, chemical control systems based on organic synthetized pesticides have been mainly used as a method of controlling pests of crops. However, pesticide's abuse, toxicity, environmental pollution and adverse effects on the natural ecosystem are increasing as well as side effects of its reduction in drug efficacy due to the occurrence of drug resistance. Therefore, there is a demand for the development of a biopesticide having an excellent plant disease control effect that can replace synthetic pesticides.

Biopesticides are products in which natural products, natural enemies and beneficial microorganisms derived from natural environment are selected and produced for agricultural use in order to remove diseases, insects and weeds in crops. Biopesticides include microbial pesticides, biochemical biopesticides and the like. Microbial pesticides are developed using microorganisms themselves such as bacteria, fungi, viruses and nematodes. Biochemical pesticides are developed using natural products derived from plants or microorganisms.

The present inventors have continuously conducted their research to find a substance having a strong antibacterial activity against a plant pathogenic bacterium. As a result, it has been found that a volatile substance derived from a *Streptomyces* sp. strain exhibits antibacterial activity and that the volatile substance is caryolan-1-ol, thereby completing the present invention.

DISCLOSURE

Technical Problem

An object of the present invention is to provide an antibacterial composition containing caryolan-1-ol.

Another object of the present invention is to provide a plant disease control composition containing caryolan-1-ol and a method of controlling plant diseases using the composition as described above.

Technical Solution

In order to achieve the objects as described above, the present invention provides an antibacterial composition containing caryolan-1-ol.

Further, the present invention provides a plant disease control composition containing caryolan-1-ol.

Further, the present invention provides a method of controlling plant diseases including treating a plant or cultivated soil with caryolan-1-ol.

Advantageous Effects

The caryolan-1-ol according to the present invention is a volatile substance isolated from a *Streptomyces* sp. strain, which has excellent antifungal effect on various plant pathogens including *Botrytis cinerea, Fusarium oxysporum, Phytophthora nicotinae, Colletotrichum gloeosporioides, Rhizoctonia cerealis, Rhizoctonia solani* and *Gibberella moniliformis* and the inhibitory and herbicidal activity on storage diseases, thereby being usable as an antifungal composition and a plant disease control composition.

DESCRIPTION OF DRAWINGS

FIG. 1 is a view showing the antifungal activity against a plant pathogen of a volatile substance secreted by *Streptomyces* sp. strain.

FIG. 2 is a view showing an inhibitory activity against a strawberry storage disease of a volatile substance secreted by *Streptomyces* sp. strain.

FIG. 3A is a view showing the results of analyzing the components of volatile substances secreted by four kinds of actinomycetes through gas chromatography analysis.

FIG. 3B is a view showing the results of the comparison of mass spectrometry spectra of Geosmin and volatile substances secreted by four kinds of actinomycetes.

FIG. 3C is a view showing the results of the comparison of mass spectrometry spectra of caryolan-1-ol and volatile substances secreted by four kinds of actinomycetes.

FIG. 4 is a view showing the antifungal activity of mixture A (including Geosmin) and mixture B (including caryolan-1-ol) containing volatile substances isolated from four kinds of actinomycetes.

FIG. 5A is a view showing the results of gas chromatography analysis of a caryolan-1-ol synthesized with a volatile substance derived from *Streptomyces griseus*, which was extracted in a solid phase trace.

FIG. 5B is a view showing the results of comparison of mass spectrometry of caryolan-1-ol synthesized with a volatile substance derived from *Streptomyces griseus*, which was extracted in a solid phase trace.

FIG. 6 is a view showing antifungal activity against *Botrytis cinerea* of caryolan-1-ol synthesized.

MODES OF THE INVENTION

Hereinafter, the present invention is described in detail.

The present invention provides an antibacterial composition containing caryolan-1-ol, which is represented by the following Chemical Formula 1.

[Chemical Formula 1]

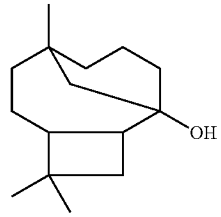

The caryolan-1-ol of the present invention is a volatile substance having the chemical formula $C_{15}H_{26}O$ and has an average molecular weight of about 222 Da. The caryolan-1-ol may be commercially available, synthesized or isolated from natural products without limitation.

The caryolan-1-ol of the present invention may be preferably isolated from *Streptomyces* sp. strains, for example, *Streptomyces griseus* or *Streptomyces badius*, but is not limited thereto.

In the present invention, the term "antibacterial" refers to the ability to resist bacteria and means all the mechanisms that are taken to defend against the action of microorganisms such as bacteria or fungi.

In the present invention, the term "antibacterial composition" may have same meaning as antibiotics, which are generically referred to as an antimicrobial agent, and may have the same meaning as an antibacterial agent, a bactericide, an antiseptic, a preservative or a bactericidal agent, and refers to a substance capable of suppressing or inhibiting the growth and function of a bacterium.

The caryolan-1-ol of the present invention has an antifungal activity against *Botrytis* sp. strain, *Fusarium* sp. strain, *Phytophthora* sp. strain, *Colletotrichum* sp. strain, *Rhizoctonia* sp. strain or *Gibberella* sp. strain, and preferably *Botrytis cinerea, Fusarium oxysporum, Phytophthora nicotinae, Colletotrichum gloeosporioides, Rhizoctonia cerealis, Rhizoctonia solani* or *Gibberella moniliformis.*

One embodiment of the present invention confirms that the caryolan-1-ol has excellent antifungal effect on various plant pathogens including *Botrytis cinerea, Fusarium oxysporum, Phytophthora nicotinae, Colletotrichum gloeosporioides, Rhizoctonia cerealis, Rhizoctonia solani* and *Gibberella moniliformis* and the inhibitory and herbicidal activity on storage diseases, thereby being useful for controlling plant diseases and accelerating plant growth.

As another aspect, the present invention provides a plant disease control composition containing caryolan-1-ol.

In the present invention, the plant diseases include, but are not limited to, storage disease, gray mold, wilt disease, plague, anthracnose, brown leaf blight, pressed leaf blight, grass root blight, damping-off or ear rot.

According to the present invention, the storage disease is caused due to the propagation of pathogens when storing and circulating grains, fruits, bulbs, vegetables, and the like.

In the present invention, the gray mold refers to a plant disease in which a leaf changes to brown from its edge and wavy wrinkles are caused around the lesion. Small and black spots appear on the lesion, fluffy gray fungi (conidiophore or conidial spore) are formed in high humidity. The gray mold is mainly caused by young leaves, leaves grown on water sprout and young fruits. The gray mold is often found on leaves in the shade such as the lower part of the water pipe and the inner leaves. *Botrytis cinerea* is a typical pathogen.

In the present invention, the wilt disease is a plant disease in which the growth is inhibited and the lower leaf is slightly yellowish, falls down, slowly wilts and dyes. The wilt disease is a typical cause of replant failure. The typical pathogen is *Fusarium oxysporum.*

In the present invention, the plague is caused by *Phytophthora* sp. fungus belonging to the mastigomycotina. Most occur in leaves, stems, fruits and roots of plants, but the occurrence site and symptoms are different depending on kinds of plants and pathogens. Symptoms of the plague include wilting and damping-off when roots or stalks are infected and soft rot or black rot or infiltrative large spot on sclerophyll when sclerophyll or fruit is infected. Representative pathogens include, but are not limited to, *Phytophthora* nicotinae, *Phytophthora infestans, Phytophthora capsici, Phytophthora cactorum, Phytophthora drechsleri* and the like.

In the present invention, the anthracnose is a plant disease caused by anthrax infection, and is distinguished from anthrax disease by an animal. Typical pathogens include *Colletotrichum gloeosporioides, C. acutatum, C. cocodes, C. dematium* and the like.

In the present invention, the brown leaf blight is also called ashen blight of leaf blight, and it is a plant disease which is mainly changed to brown color from leaf edge, and the boundary between the healthy part and the lesion is clearly classified by dark brown color portion. Small black spots (conidial spore layer) appear on the lesion of both sides of leaves, and black spiked conidial spores rise when humid. A representative pathogen is *Rhizoctonia solani.*

In the present invention, the grass root disease is a disease in which grass roots are rotten. A representative pathogen is *Rhizoctonia solani.*

In the present invention, the ear rot disease is caused by *Gibberella moniliformis, Fusarium moniliforme, Gibberella fujikuroi* and the like and occurs mainly in corn.

In the present invention, the plant disease may be caused by *Botrytis* sp. strain, *Fusarium* sp. strain, *Phytophthora* sp. strain, *Colletotrichum* sp. strain, *Rhizoctonia* sp. strain or *Gibberella* sp. strain, and may be preferably caused by *Botrytis cinerea, Fusarium oxysporum, Phytophthora nicotinae, Colletotrichum gloeosporioides, Rhizoctonia cerealis, Rhizoctonia solani* or *Gibberella moniliformis.*

The composition of the present invention may be prepared using carriers which can be used as agricultural chemicals other than caryolan-1-ol.

The carrier may include one as long as it is an acceptable carrier as conventionally used pesticide formulations. In particular, the carrier may preferably include freezing preservative skim milk, yeast extract, PG and electrodeposition agent SOF70, surfactants TD20A and AS65D, but is not limited thereto.

The composition of the present invention may be produced and used in various formulations by including excipients and diluents in addition to the above carriers. Further, the composition may include a coating flocculent material which allows the active ingredient to adhere well to plant leaves or to be well degraded in the soil. The composition of the present invention may be formulated into a liquid or an oil. The composition may be typically diluted in water and dispersed as a powder. The composition may be formulated with water in advance or formulated into a soluble wettable powder, a granule, an oil suspension. Further, the composition may be produced in a form of ready mix or tank mix for a mixture with other agrochemical active compounds, such as safeners, and growth regulators.

The active ingredient according to the present invention may be contained in an amount of 0.001% by weight to 90% by weight, preferably 0.01% by weight to 50% by weight, with respect to the total composition of controlling plant diseases, but is not limited thereto.

The plant disease control composition according to the present invention may preferably be used for at least one selected from the group consisting of treatment of applying the composition to plant seeds, treatment of immersing plant seeds, treatment of irrigating plant cultivated soil, treatment of applying the composition to plant cultivated soil surface, treatment of spraying the composition to plant sclerophyll and treatment of bringing the composition into contact with the plant floating part, but it is not limited thereto.

Further, since the caryolan-1-ol of the present invention is characterized by being a volatile substance, the plant disease control composition of the present invention can be produced in the form of a fumigant or a smoking agent. The fumigant or the smoking agent may include an auxiliary agent such as an effect enhancer, an evaporation enhancer, a decomposition inhibitor, a stabilizer, a physical property improver, an adhesive, a thickener, and a fumigation mitigator.

The plant disease control composition of the present invention can be used as a general pesticide such as a plant disease controlling agent, a seed coating agent, a microbial nutrient, and a soil improving agent.

Further, the present invention provides a method of controlling plant diseases, the method including treating plant or cultivated soil with caryolan-1-ol.

The method is characterized by applying the effective non-phytotoxic amount of the caryolan-1-ol to seed treatment, leaf application, stem application, or seed, plant and/or plant fruit or soil and/or inert substrate which plants are growing or to grow plants (For example, an organic substrate such as sand, rock wool, glass wool, an expansive mineral (e.g., pearlite, vermiculite, zeolite and expansive clay), a pumice, a pyroclastic substance/tuff, synthetic organic substrates (e.g., polyurethane), an organic substrate (e.g., peat, compost, wood waste (e.g., coir, wood fiber/chip and bark) or a liquid substrate (e.g., floating water systems, Nutrient Film Technique, Aeroponics) by drench/drip application (irrigation).

In addition, the method of controlling plant diseases may be a fumigation control method, that is, a method of controlling the pest by fumigating the caryolan-1-ol of the present invention having a fuming effect in a greenhouse which is sealed in a gas or a vapor state. It is preferable that the fumigation control method is used in a place where the degree of sealing is relatively high so as to reduce the loss of pesticide. In one embodiment of the present invention, an adsorbent material such as silica gel may be used for the fumigation control method.

The term "effective non-phytotoxic amount" means an amount that is sufficient to rescue or eradicate pests and/or diseases present in or likely to be present in the crop, but not accompanied by any significant phytotoxic symptoms of the crop. This amount can vary widely depending on the insect and disease to be eliminated or remedied, the type of crop, the climatic conditions and the compound contained in the composition according to the present invention. The amount may be determined by those skilled in the art and may be determined by systematic field trials.

As described above, the caryolan-1-ol of the present invention is excellent in antifungal activity against plant pathogens, and can be applied to plants or areas requiring control, thereby preventing plant diseases such as storage disease, gray mold, wilt disease, plague, anthracnose, brown leaf blight, pressed leaf blight, grass root blight, damping-off or ear rot.

Hereinafter, the present invention is described in detail with reference to Examples. It should be understood, however, that these Examples are provided for illustrative purposes only and are not to be construed as limiting the scope of the present invention.

Example 1. Verification of Antifungal Activity of Volatile Substances

In order to verify the antifungal activity of the volatile substances secreted by *Streptomyces griseus* S4-7', the following experiment was conducted according to a commonly known method. The pathogens used in this experiment were as follows: *Botrytis cinerea, Fusarium oxysporum, Phytophthora nicotinae, Colletotrichum gloeosporioides, Rhizoctonia cerealis, Rhizoctonia solani* and *Gibberella moniliformis.*

Nine Petri dishes of *Streptomyces griseus* S4-7' cultured for 10 days and one Petri dish seeded with the pathogens were put together in a sealed container and cultured at 27° C. At this time, *Phytophthora* nicotinae was cultured in V8 medium (V8 juice 100 ml, $CaCO_3$ 1 g, Agar 17 g with respect to 1 liter), and *Streptomyces griseus* S4-7' and the rest of the pathogens were cultured in PDK (Potato dextrose 10 g, Peptone 10 g, Agar 20 g with respect to 1 liter). In order to test for other actinomycetes, the same experiment was carried out using two kinds of *Streptomyces badius* and one kind of only classified *Streptomyces*. The results are shown in FIG. 1.

As shown in FIG. 1, it was confirmed that the volatile substances secreted by *Streptomyces* sp. strain showed strong antifungal activity against the seven kinds of pathogens as described above.

Example 2. Verification of Antifungal Activity Against Storage Diseases of Volatile Substances In order to verify the antifungal activity against the storage diseases of volatile substances secreted by *Streptomyces griseus* S4-7', six Petri dishes of *Streptomyces griseus* S4-7' cultured for 10 days, 3 g of $MgCl_2$ dihydrate for controlling humidity and strawberries were placed in a sealed container and observed. The storage was maintained at room temperature. The results are shown in FIG. 2.

As shown in FIG. 2, it was confirmed that strawberry storage disease was inhibited by the volatile substances secreted by *Streptomyces griseus* S4-7'.

Example 3. Collection and Identification of Volatile Substances

The CAR/DVB/PDMS fibers were heated at 250° C. for 30 minutes to remove foreign matters. Then, each of four kinds of actinomycetes (*Streptomyces griseus* S4-7', two kinds of *Streptomyces badius* and one kind of only classified *Streptomyces*) cultivated in PDK for 10 days was placed in a 600 ml flask preheated to 80° C. and heated at 80° C. for 30 minutes so that volatile substances were adsorbed and extracted using CAR/PDMS and DVB/PDMS fibers for 30 minutes. The components of volatile substances were analyzed using Shimazu GC-TQ8030. DB-5 ms was used for the stationary phase, helium was used for the mobile phase, and mass spectrometry was tried by electron impact ionization. The results are shown in FIGS. 3A to 3C.

As shown in FIGS. 3A to 3C, Geosmin and Caryolan-1-ol, which are common compounds from four kinds of actinomycetes, were identified.

Example 4. Verification of Volatile Substances Showing Antifungal Activity

The following experiment was performed to confirm which of the compounds obtained in Example 3 exhibited antifungal activity. 20 Petri dishes of *Streptomyces griseus* cultured in PDK for 10 days or more were placed in a 600 ml chamber, and the air filtered with activated carbon was blown at 60 ml/min. The volatile substances coming out through the pipes of 6 L flask were adsorbed on 200 mg of 'super Q 100' synthetic fiber and collected for 7 days. This procedure was repeated three times to obtain 0.3 mg of the mixture A having Geosmin as a main component and 1 mg of the mixture B having caryolan-1-ol as a main component through silica gel column chromatography. The mycelia of *Botrytis cinerea* were cut to have a radius of 2 mm and seeded into the PDA medium. The paper disc was placed on the lid of the Petri dish. The mixtures A and B were dissolved in 100 μl of acetone, and they were treated in different amounts. The ratio to the acetone treatment group was obtained by the following equation, and the result is shown in FIG. 4.

(Length of mycelium−2 mm)/(Length of acetone treatment group−2 mm)

As shown in FIG. 4, it was confirmed that the mixture B containing caryolan-1-ol had a stronger antifungal activity than the mixture A containing Geosmin. Thus, it was confirmed that caryolan-1-ol is an active ingredient showing antifungal activity among the volatile substances secreted by actinomycetes.

Example 5: Verification of Antifungal Activity of Caryolan-1-Ol

In order to re-verify the results of Example 4, experiments were performed as follows.

5-1. Synthesis of Caryolan-1-Ol First, the following experiment was conducted to synthesize caryolan-1-ol. 3 g of β-caryophyllene and butylated hydroxytoluene were dissolved together in 100 ml of acetic acid to prepare a solution. The solution was passed twice through Amberlyst-15, a strong acidic cation exchange resin, at a rate of 2 mL/min to 3 mL/min and diluted with ether. The solution was washed five times with 2N sodium hydroxide solution, and the solvent was purified by silica gel column chromatography (yield of 45% and purity of 53%). They were treated using a fraction collector to obtain 100 mg of caryolan-1-ol having a purity of 94%. The synthesized compound was analyzed by $^{1}H$, $^{13}C$ nuclear magnetic resonance analysis using Bruker DRX-500 so that the compound was found to be caryolan-1-ol.

In addition, the solid phase micro-extracted volatile substance derived from *Streptomyces griseus* was analyzed by gas chromatography so that the substance was identified as caryolan-1-ol prepared through the above procedure. GC2010, which is the gas chromatograph model manufactured by Shimazu Co. and QP2010plus mass spectrometer were used. The stationary phase was obtained using HP-Innowax at a temperature of 250° C., and the mobile phase was obtained using helium. The results are shown in FIGS. 5A and 5B.

As shown in FIG. 5A, the retention time of the synthesized substance was the same as that of the volatile substance derived from the solid phase micro-extracted volatile substance derived from *Streptomyces griseus*. As shown in FIG. 5B, their mass spectrometry spectra were the same. The results indicated that two compounds were the same compound caryolan-1-ol.

5-2. Identification of Antifungal Activity of Caryolan-1-Ol

Next, in order to verify the antifungal activity of the synthesized caryolan-1-ol, PDA (Potato starch 4 g, dextrose 20 g, Agar 20 g with respect to 1 liter) medium was prepared so as to allow 60 mm Petri dishes to have 12 ml space. *Botrytis cinerea* was inoculated with a radius of 2 mm. Based on the concentration at which caryolan-1-ol was completely gaseous, caryolan-1-ol was dissolved in acetone, and then the solution was treated to the paper disc placed on a lid at 10 μl each. After sealing, they were cultured at 27° C., and the growth rate of mycelium was measured for 4 days. The growth rate for the acetone treatment group was determined. The results are shown in FIG. 6.

As shown in FIG. 6, it was confirmed that caryolan-1-ol significantly inhibited the growth of plant pathogen, *Botrytis cinerea*, in proportion to the concentration.

As described above, the caryolan-1-ol, which is a volatile substance isolated from a *Streptomyces* sp. strain according to the present invention, has an excellent antifungal effect on various plant pathogens including *Botrytis cinerea, Fusarium oxysporum, Phytophthora nicotinae, Colletotrichum gloeosporioides, Rhizoctonia cerealis, Rhizoctonia solani* and *Gibberella moniliformis* and the like, and has storage disease preventive and herbicidal activity, thereby being usable as an antibacterial composition and a plant disease control composition.

The invention claimed is:

1. A method of controlling a plant disease caused by at least one plant pathogenic fungus selected from the group consisting of *Botrytis cinerea, Fusarium oxysporum, Phytophthora nicotinae, Colletorichum gloeosphoriodies, Rhizoctonia cerealis, Rhizoctonia solani* and *Gibberella moniliformis*, the method comprising treating a plant or cultivated soil with caryolan-1-ol represented by the following Chemical Formula 1:

[Chemical Formula 1]

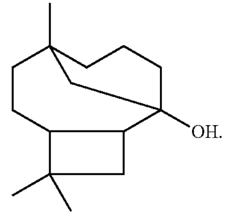

2. The method of claim 1, wherein the plant disease includes at least one selected from the group consisting of storage disease, gray mold, wilt disease, plague, anthracnose, brown leaf blight, pressed leaf blight, grass root blight, damping-off or ear rot.

* * * * *